United States Patent
Drill

(10) Patent No.: US 10,479,198 B2
(45) Date of Patent: Nov. 19, 2019

(54) TRANSFER CASE WITH ACTIVE CLUTCH ON FRONT OUTPUT AND PASS-THRU REAR OUTPUT

(71) Applicant: Magna Powertrain of America, Inc., Troy, MI (US)

(72) Inventor: Daniel M. Drill, Rochester, MI (US)

(73) Assignee: MAGNA POWERTRAIN OF AMERICA, INC., Troy, MI (US)

( * ) Notice: Subject to any disclaimer, the term of this patent is extended or adjusted under 35 U.S.C. 154(b) by 378 days.

(21) Appl. No.: 15/538,247

(22) PCT Filed: Jan. 5, 2016

(86) PCT No.: PCT/US2016/012127
§ 371 (c)(1),
(2) Date: Jun. 21, 2017

(87) PCT Pub. No.: WO2016/111973
PCT Pub. Date: Jul. 14, 2016

(65) Prior Publication Data
US 2017/0368933 A1    Dec. 28, 2017

Related U.S. Application Data

(60) Provisional application No. 62/100,222, filed on Jan. 6, 2015.

(51) Int. Cl.
*B60K 17/344* (2006.01)
*F16H 57/035* (2012.01)
(Continued)

(52) U.S. Cl.
CPC ........... *B60K 17/344* (2013.01); *B60K 17/02* (2013.01); *B60K 23/0808* (2013.01); *F16H 7/06* (2013.01);
(Continued)

(58) Field of Classification Search
CPC ................ B60K 17/344; F16H 57/035; F16D 2001/103
(Continued)

(56) References Cited

U.S. PATENT DOCUMENTS 4,103,753 A * 8/1978 Holdeman ........... B60K 17/344
180/233
4,542,801 A * 9/1985 Richards ................ B60K 17/28
180/235
(Continued)

FOREIGN PATENT DOCUMENTS

EP        0967105 A2    12/1999

OTHER PUBLICATIONS

International Search Report and Written Opinion dated Apr. 19, 2016 from International Patent Application Serial No. PCT/US2016/012127.

*Primary Examiner* — Ha Dinh Ho
(74) *Attorney, Agent, or Firm* — Dickinson Wright PLLC

(57) ABSTRACT

A transfer case for use in a four-wheel drive vehicle and having a clutch assembly disposed on a front output and a pass-through rear output arrangement. The front output is a front output shall. The rear output is established by directly interconnecting a transmission output shaft to an end segment of a rear propshaft. A transfer assembly is driven by the transmission output shaft and can be selectively coupled to the front output shaft via the clutch assembly.

18 Claims, 6 Drawing Sheets

(51) Int. Cl.
*F16D 1/10* (2006.01)
*B60K 17/02* (2006.01)
*B60K 23/08* (2006.01)
*F16H 7/06* (2006.01)
*F16D 1/06* (2006.01)
*F16D 13/52* (2006.01)
*F16D 23/12* (2006.01)
*F16H 1/16* (2006.01)

(52) U.S. Cl.
CPC .............. *F16H 57/035* (2013.01); *F16D 1/06* (2013.01); *F16D 1/10* (2013.01); *F16D 13/52* (2013.01); *F16D 23/12* (2013.01); *F16D 2001/103* (2013.01); *F16D 2023/123* (2013.01); *F16H 1/16* (2013.01)

(58) Field of Classification Search
USPC ...................................................... 74/665 GE
See application file for complete search history.

(56) References Cited

U.S. PATENT DOCUMENTS

| | | | | |
|---|---|---|---|---|
| 5,226,860 | A | * | 7/1993 | Baxter, Jr. ......... B60K 17/3462 180/247 |
| 5,332,060 | A | * | 7/1994 | Sperduti .............. B60K 17/344 180/197 |
| 5,348,517 | A | * | 9/1994 | Dick .................... B60K 17/342 180/249 |
| 5,725,453 | A | * | 3/1998 | Zalewski ............... B60K 17/22 180/248 |
| 8,157,072 | B2 | | 4/2012 | Bowen |
| 8,235,860 | B2 | * | 8/2012 | Williams ............. B60K 17/344 475/299 |
| 8,316,738 | B2 | | 11/2012 | Hellinger et al. |
| 9,751,404 | B2 | * | 9/2017 | Imafuku ................ B60K 17/34 |
| 2009/0008206 | A1 | | 1/2009 | Bowen |

\* cited by examiner

TRANSFER CASE WITH ACTIVE CLUTCH ON FRONT OUTPUT AND PASS-THRU REAR OUTPUT

CROSS-REFERENCE TO RELATED APPLICATIONS

This application is a National Stage of International Application No. PCT/US2016/012127 filed Jan. 5, 2016 and which claims the benefit and priority of U.S. Provisional Application No. 62/100,222, filed on Jan. 6, 2015. The entire disclosure of each of the above applications is incorporated herein by reference.

FIELD

The present disclosure relates generally to power transfer systems for controlling the distribution of drive torque from a powertrain to front and rear drivelines of a four-wheel drive motor vehicle. More particularly, the present disclosure is directed to a compact transfer case having an actively-controlled clutch assembly operably associated with a front output drivingly interconnected to the front driveline and a pass-through rear output directly interconnecting the powertrain to the rear driveline

BACKGROUND

This section provides background information related to the present disclosure which is not necessarily prior art.

In view of increased consumer interest in four-wheel drive vehicles, a plethora of power transfer systems are currently being utilized in vehicular applications for selectively directing rotary tractive power (i.e., drive torque) from the powertrain to all four wheels of the vehicle. In many power transfer systems, a transfer case is used for delivering drive torque from the powertrain to one or both of the front and rear drivelines. Some conventional transfer cases are equipped with a mode clutch, typically a positive-locking type of dog clutch, that can be selectively actuated via operation of a mode shift mechanism to shift between a two-wheel drive mode and a part-time (i.e. locked) four-wheel drive mode. In addition, many transfer cases also include a two-speed reduction unit and a range clutch which can be selectively actuated via operation of a range shift mechanism for shifting between four-wheel high-range and low-range drive modes.

It is also known to use "on-demand" power transfer systems for automatically distributing the drive torque generated by the powertrain between the front and rear drivelines, without any input or action on the part of the vehicle operator, when traction is lost at either the front or rear wheels. Modernly, it is known to incorporate the "on-demand" feature into a transfer case by replacing the mechanically-actuated mode clutch with a multi-plate clutch assembly and a power-operated clutch actuator that is interactively associated with an electronic control system and a plurality of vehicle sensors. Such transfer cases configured to permit electronic control over the drive torque distribution between the front and rear drivelines are commonly referred to as "active" transfer cases. During normal road conditions, the multi-plate clutch assembly is typically maintained in a release condition such that drive torque is only delivered to the rear wheels. However, when the sensors detect a low traction condition, the power-operated clutch actuator is operated for engaging the multi-plate clutch assembly to deliver drive torque automatically to the front wheels. Moreover, the amount of drive torque transferred through the multi-plate clutch assembly to the front wheels can be varied as a function of specific vehicle operating characteristics and/or road conditions, as detected by the sensors. This adaptive clutch control system can also be used in full-time transfer cases to automatically bias the torque distribution ratio across an interaxle differential.

A majority of current active transfer cases include a rear output shaft interconnecting the transmission output to the rear driveline, a front output shaft interconnected to the front driveline, a transfer assembly driven by the front output shaft, and a power-operated clutch assembly arranged to selectively/automatically couple the transfer assembly to the rear output shaft for transmitting drive torque to the front driveline. Typically, the transfer assembly includes a first sprocket rotatably supported on the rear output shaft, a second sprocket fixed for rotation with the front output shaft, and a chain encircling and drivingly interconnecting the first sprocket for rotation with the second sprocket. The clutch assembly and various components of the power-operated clutch actuator are typically disposed to surround the rear output shaft and function to selectively/automatically couple the first sprocket to the rear output shaft.

Such active transfer cases also require lubrication of the clutch assembly and other rotary components. A sump of lubricant is maintained in a lower portion of the transfer case so as to typically submerge at least the second sprocket. A passive lubrication system utilizes lubricant splashed throughout the transfer case upon rotation of the sprockets to lubricate the rotary components and to cool the clutch assembly. As alternative, a shaft-driven gear or gerotor lube pump can be operably associated with the rear output shaft to pump lubricant from the sump and distribute such lubricant in response to rotation of the rear output shaft. Finally, an actively-controlled or "on-demand" lube pump can be installed with the transfer case to provide optimal lubricant flow in a manner that is independent of the rotational characteristics of the rear output shaft.

In the past, the vehicle ride height and suspension configuration of many trucks and sport utility vehicles provided sufficient packaging volume for such traditional active transfer cases equipped with a pair of offset output shafts. However, in view of increased demand for smaller four-wheel drive vehicles, the packaging volume allocated to the powertrain and the transfer case has been greatly reduced. To accommodate reduced packaging space, commonly-owned U.S. Pat. No. 8,316,738 discloses an active transfer case having a traditional rear output shaft and clutch assembly configuration in association with a beveloid gearset type of transfer assembly and an angulated front output shaft. Alternatively, some active transfer cases have been developed which position the clutch assembly and power-operated clutch actuator on the front output shaft as shown, for example, in U.S. Pat. No. 8,157,072.

While such alternative transfer case configurations attempt to address the need for reduced packaging requirements, a need still exists to advance the technology and structure of active transfer cases to provide enhanced configurations that improve upon the prior art.

SUMMARY

This section provides a general summary of the disclosure and is not intended to be interpreted as a complete and comprehensive disclosure of all of its features, advantages, objectives and aspects.

It is an aspect of the present disclosure to provide a transfer case for use in a four-wheel drive vehicle that is configured to transmit drive torque directly from the transmission output to the rear driveline.

It is a related aspect of the present disclosure to provide a transfer case configured to eliminate the conventional rear output shaft by interconnecting the transmission output to a rear propshaft associated with the rear driveline.

It is another related aspect of the present disclosure to provide a transfer case including a front output shaft adapted for interconnection to the front driveline, a transfer assembly having a first transfer component fixed for rotation with the transmission output and a second transfer component drivingly connected to the first transfer component and which is rotatably supported on the front output shaft, and a clutch assembly operable for selectively coupling and uncoupling the second transfer component with the front output shaft. The transmission output extends at least partially through the transfer case and is configured to be drivingly coupled to the rear propshaft of the rear driveline.

It is another related aspect of the present disclosure to provide an active transfer case having a transfer assembly directly coupled to the transmission output, a multi-plate friction clutch assembly operably installed on the front output shaft, and a power-operated clutch actuator for selectively/automatically transferring drive torque from the transmission output through the transfer assembly to the front output shaft.

In accordance with these and other aspects of the present disclosure, an active transfer case is disclosed for use in a four-wheel drive vehicle having front and rear drivelines. The active transfer case is configured for interconnecting an output shaft of the transmission to a first end of a rear propshaft, the opposite end of which is drivingly coupled to a rear differential of a rear axle assembly associated with the rear driveline. The active transfer case of the present disclosure includes: a t-case housing adapted to be attached to a transmission housing of the transmission; a front output shaft rotatably supported by the t-case housing and which is adapted for connection to a first end of a front propshaft, the opposite end of which is drivingly coupled to a front differential of a front axle assembly associated with the front driveline; a transfer assembly having a first sprocket drivingly coupled to the transmission output shaft and rotatably supported in the t-case housing, a second sprocket rotatably supported on the front output shaft, and a chain drivingly intermeshed with both of the first and second sprockets; a multi-plate friction clutch assembly operably disposed between the second sprocket and the front output shaft; and a power-operated clutch actuator for adaptively regulating the magnitude of a clutch engagement force applied to the multi-plate friction clutch assembly.

In accordance with an alternative embodiment, the active transfer case of the present disclosure includes: a t-case housing adapted to be secured to the transmission housing of the transmission; a front output shaft rotatably supported by the t-case housing and adapted for connection to the front driveline; a transfer assembly having a first gear coupled for rotation with the transmission output, a second gear rotatably supported on the front output shaft, and a third gear meshed with the first and second gears; a multi-plate friction clutch assembly operably disposed between the second gear and the front output shaft; and a power-operated clutch actuator for adaptively regulating a clutch engagement force applied to the multi-plate friction clutch assembly for controlling the drive torque transferred from the transmission output to the front output shaft through the transfer assembly.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
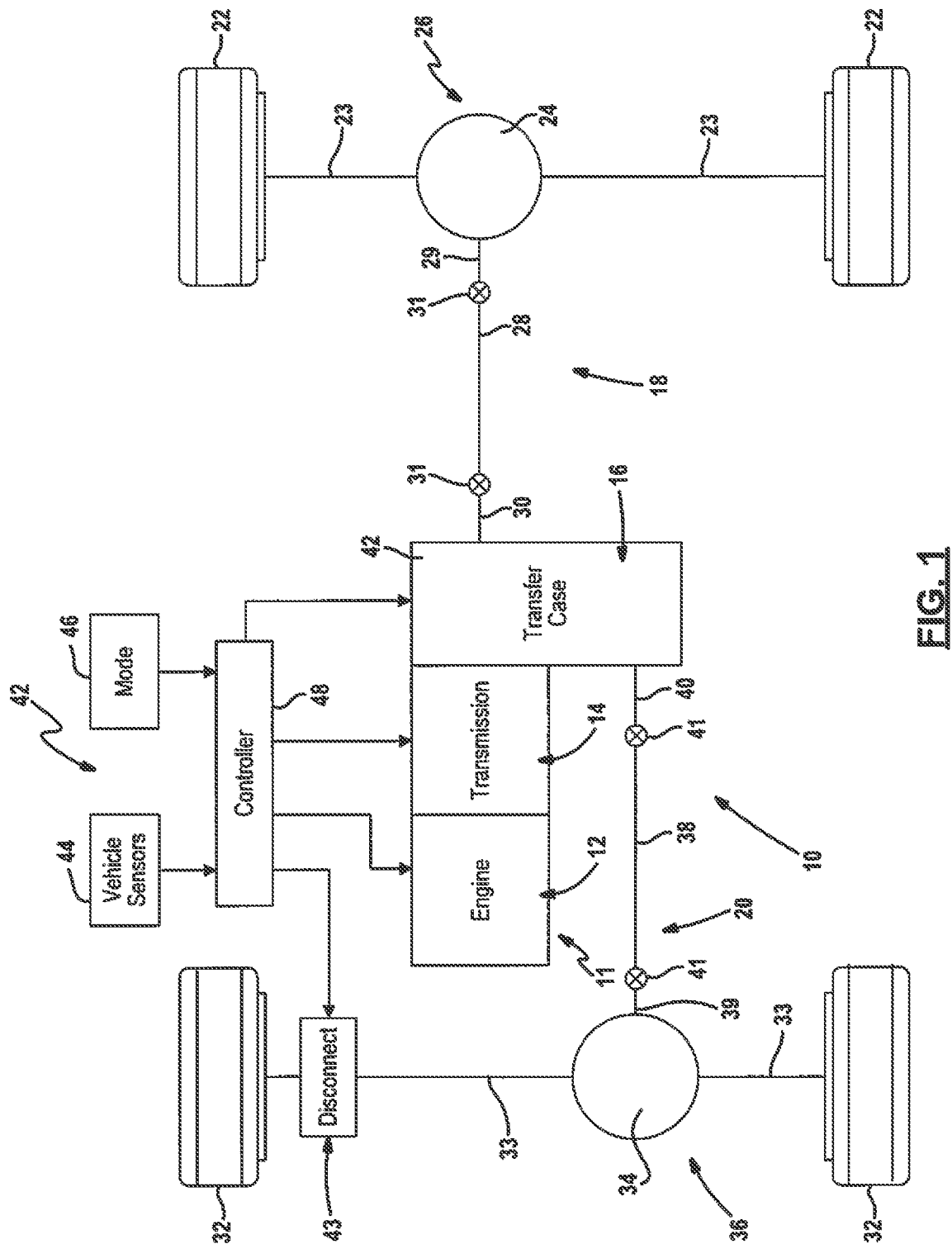
FIG. 1 is a schematic view of a four-wheel drive motor vehicle equipped with a transfer case constructed and operable in accordance with the teachings of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "compromises," "comprising," "including," and "having," are inclusive and therefore specify the presence of stated features, integers, steps, operations, elements, and/or components, but do not preclude the presence or addition of one or more other features, integers, steps, operations, elements, and/or components, but do not preclude the presence or addition of one or more other features, integers, steps operations, elements, components, and/or groups thereof. The method steps, processes, and operations described herein are no to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring initially to FIG. 1 of the drawings, an example of a four-wheel drive motor vehicle 10 is shown schematically to include a powertrain 11 operable for generating rotary power (i.e., drive torque) which is transmitted through a transfer case 16 to a first or rear driveline 18 and a second or front driveline 20. Powertrain 11 is shown, in this non-limiting example, to include an internal combustion engine 12 and a multi-speed transmission 14. In the particular arrangement shown, rear driveline 18 includes a pair of ground-engaging rear wheels 22 drivingly connected via a pair of rear axle shafts 23 to a rear differential assembly 24 associated with a rear axle assembly 26. A rear propshaft 28 interconnects a rotary input 29 of rear differential assembly 24 to a rotary output 30 of transmission 14 which is shown to extend through transfer case 16. A pair of rear joint units 31 are shown to interconnect opposite ends of rear propshaft 28 to rotary input 29 of rear differential assembly 24 and rotary output 30 of transmission 14 and which function to transmit drive torque while permitting angular and/or translational movement therebetween.

Front driveline 20 is shown in FIG. 1 to include a pair of ground-engaging front wheels 32 drivingly connected via a pair of front axle shafts 33 to a front differential assembly 34 associated with a front axle assembly 36. A front propshaft 38 interconnects a rotary input 39 of front differential assembly 34 to a front output shaft 40 associated with transfer case 16. A pair of front joint units 41 are shown to interconnect opposite ends of front propshaft 38 to rotary input 39 of front differential assembly 34 and front output shaft 40 of transfer case 16 to transmit drive torque while permitting angular and/or translational movement therebetween. A disconnect coupling 43 is shown associated with one of front axle shafts 33 and is operable in a connected mode to drivingly couple front wheels 32 to the remainder of front driveline 20 and is operable in a disconnected mode to uncouple front wheels 32 from driven connection with the remainder of front driveline 20.

Powertrain 11 is shown in association with a powertrain control system 42 generally and schematically shown to include an array of vehicle sensors 44 and a mode selector 46, both of which provide signals which communicate with a vehicle controller 48. Vehicle controller 48 can be interpreted to include one or more individual controllers associated with engine 12, transmission 14, transfer case 16, and disconnect coupling 43 which are configured and arranged to control operation of vehicle 10.

Figure 2:
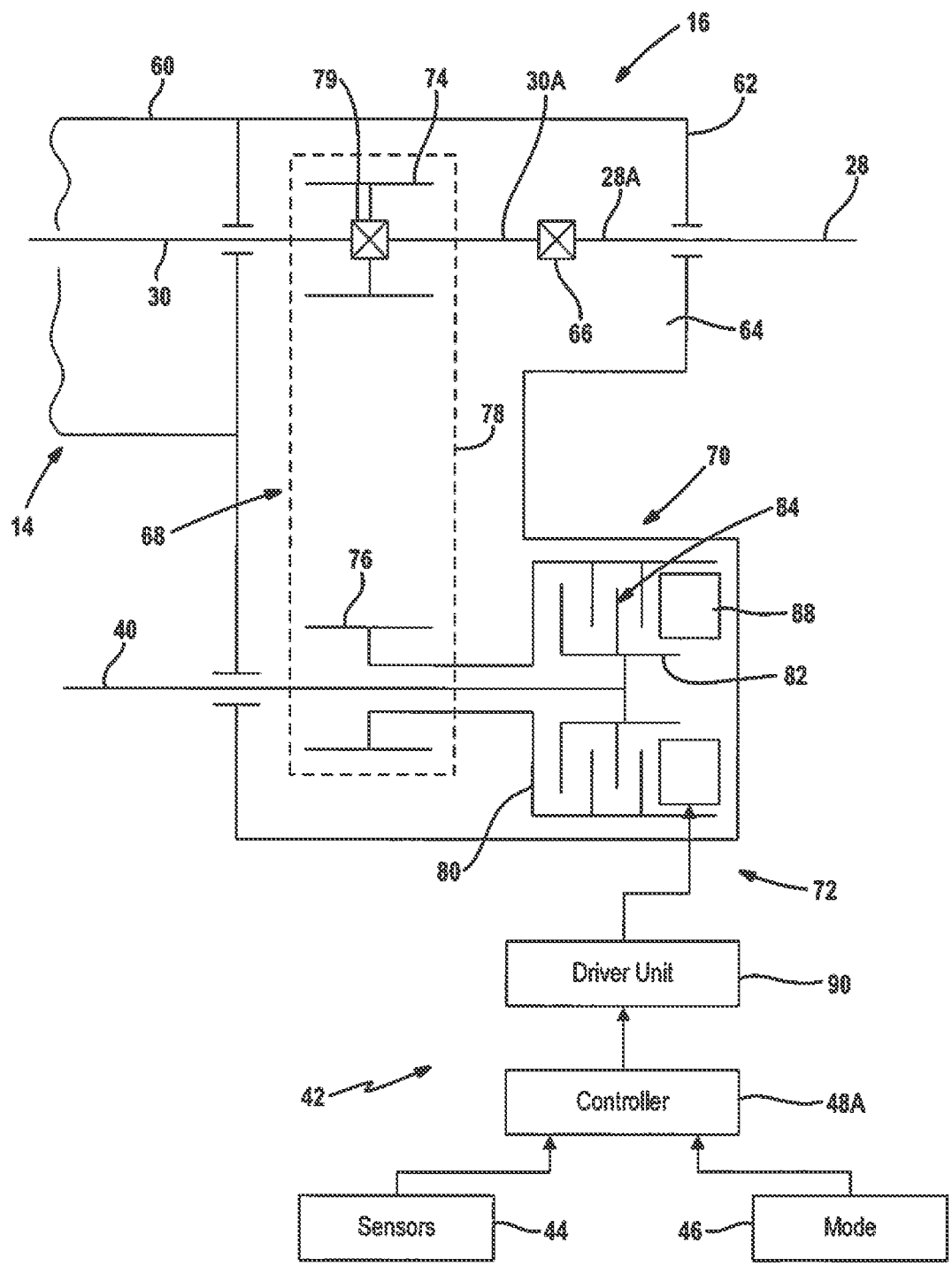
FIG. 2 is a diagrammatical illustration of the transfer case constructed in accordance with the present disclosure.

Referring to FIG. 2 of the drawings, the interaction of components associated with transmission 14 and transfer case 16 will now be described to provide a better understanding of the pass-through rear output and clutched front output concepts associated with the present disclosure. In this regard, transmission output 30 is an otherwise conventional transmission output shaft adapted to extend outwardly from a transmission housing 60. Transfer case 16 includes a t-case housing 62 adapted to be secured to transmission housing 60 and which defines an internal chamber 64. An end segment 30A of transmission output shaft 30 is shown schematically to be directly coupled to an end segment 28A of rear propshaft 28 via a coupling interface 66. Alternatively, end segment 30A of transmission output shaft 30 can be directly coupled to a shaft component of joint unit 31 which, in turn, is coupled to end segment 28A of rear propshaft 28. Based on these arrangements, a common transmission shaft 30 and a common rear propshaft 28 can be used with two-wheel/rear wheel drive (2WD/RWD) versions of motor vehicle 10 as well as with four-wheel drive (4WD) versions of motor vehicle 10.

Transfer case 16 is further shown in FIG. 2 to generally include a transfer assembly 68, a clutch assembly 70, and a power-operated clutch actuator 72. Transfer assembly 68 can be configured as a geared drive assembly or as a chain drive assembly. In the particular example disclosed, transfer assembly 68 is a chain and sprocket drive assembly having a first sprocket 74 drivingly coupled directly to transmission shaft 30, a second sprocket 76 rotatably supported on front output shaft 40, and a continuous power chain 78 encircling and meshing with both first sprocket 74 and second sprocket 76. A coupling interface 79 is schematically shown for indicating the direct coupling of first sprocket 74 with transmission shaft 30. Clutch assembly 70 is shown, in this non-limiting embodiment, as a multi-plate friction clutch having a first clutch member 80 coupled for common rotation with second sprocket 76, a second clutch member 82 coupled for common rotation with front output shaft 40, and a multi-plate clutch pack 84 comprised of a plurality of interleaved inner and outer clutch plates. Power-operated clutch actuator 72 includes an axially moveable apply device 88 capable of applying a compressive clutch engagement force on clutch pack 84, and a powered driver unit 90 operable for controlling the axial position of apply device 88 relative to clutch pack 84.

The magnitude of the clutch engagement force exerted on clutch pack 84 by apply device 88 is proportional to the amount of drive torque transmitted from transmission shaft 30 through transfer assembly 68 to front output shaft 40. Accordingly, when a predetermined minimum clutch engagement force is applied to clutch pack 84, a minimum drive torque is transmitted to front driveline 20. In contrast, when a predetermined maximum clutch engagement force is applied to clutch pack 84, a maximum drive torque is transmitted to front driveline 20. As such, adaptive control over the front/rear drive torque distribution ratio can be provided by active transfer case 16 to establish a two-wheel drive (2WD) mode and an on-demand four-wheel drive (4WD) mode. FIG. 2 illustrates a transfer case controller 48A associated with vehicle controller 48 of FIG. 1 that is operable for controlling actuation of powered driver unit 90 which, in turn, controls the axial position of apply device 88 relative to clutch pack 84.

Figure 3:
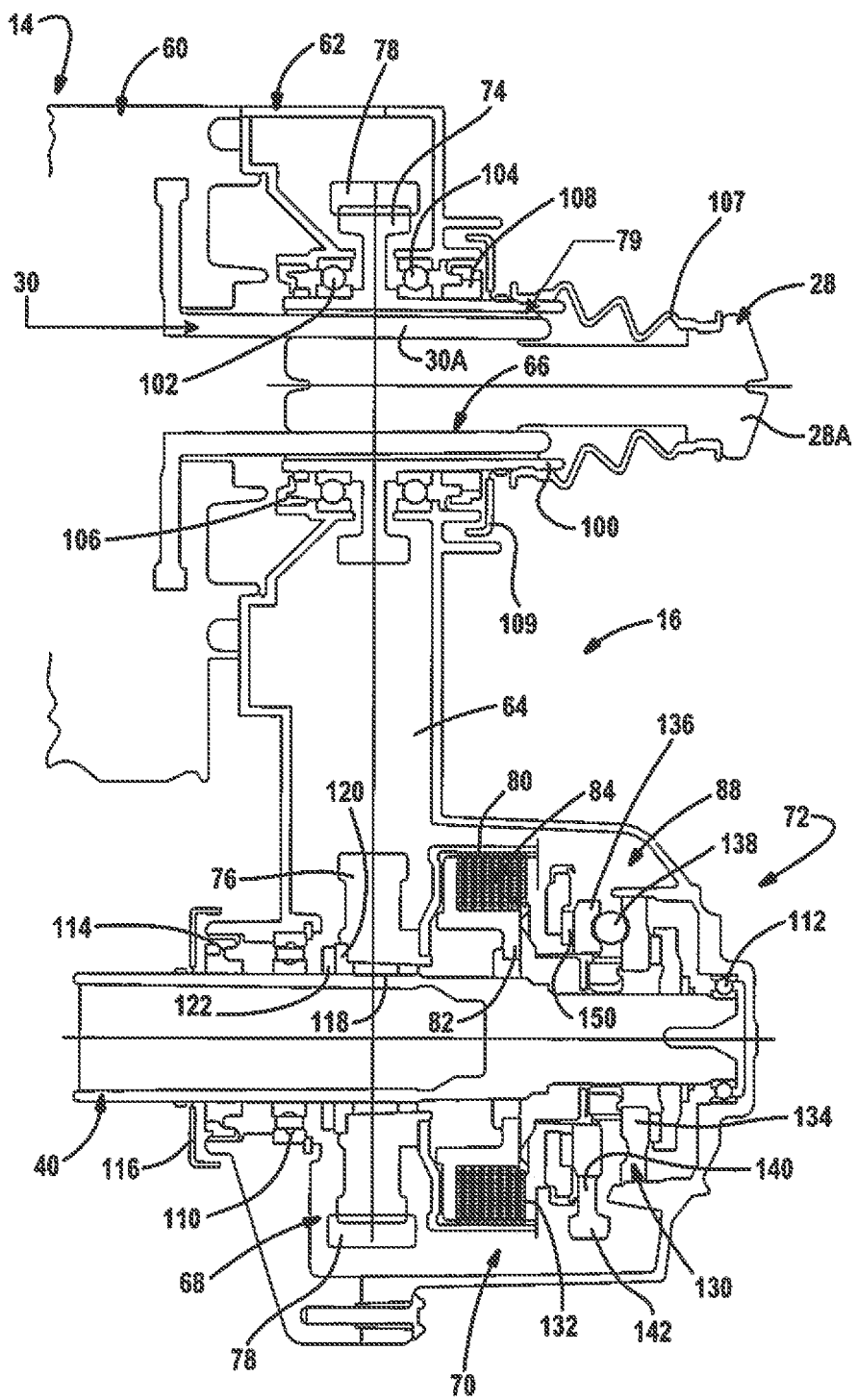
FIG. 3 is a sectional view of an embodiment of the transfer case constructed in accordance with the present invention.

Referring now to FIG. 3, a sectional view of an embodiment of transfer case 16 constructed in accordance with the present disclosure will be described in detail with common reference numerals from the schematic illustration of FIG. 2 used again to identify similar components. In general, transfer case 16 is a single-speed active transfer case with its clutch assembly and apply device arranged on the front output shaft so as to allow the rear propshaft (or a joint unit associated with the rear propshaft) to be directly connected to the transmission output shaft. This compact arrangement permits use of a common rear propshaft in a motor vehicle having 2WD and 4WD variants. This arrangement improves overall system weight and costs by eliminating the rear output shaft and concomitantly reduces vehicle assembly complexity.

Transfer case 16 of FIG. 3 is shown to have an axially-extending stubshaft segment 100 of first sprocket 74 fixed via a splined connection 79 with tubular end segment 30A of transmission shaft 30. Specifically, external splines formed on end segment 30A of transmission shaft 30 are meshed with internal splines formed on stubshaft segment 100 of first sprocket 74. A pair of laterally-spaced bearing assemblies 102, 104 are provided to support stubshaft segment 100 for rotation within t-case housing 62. First and second rotary seals 106, 108 are also disposed between stubshaft segment 100 of first sprocket 74 and t-case housing 62. As also shown in this non-limiting example, a sliding-type splined connection 66 is provided between tubular end segment 30A of transmission shaft 30 and end segment 28A of rear propshaft 28. As noted, in an alternative arrangement, an end segment of a shaft portion of joint unit 31 could be coupled via sliding spline connection 66 to end segment 30A of transmission shaft 30, with another portion of joint unit 31 being coupled to end segment 28A of rear propshaft 28. Thus, the present disclosure considers the term "rear propshaft 28" to be stand-alone arrangement or a rear propshaft assembly having joints 31 associated therewith. Regardless of the configuration, an end segment of transmission shaft 30 extends through t-case housing 62 and is directly connected to a component of rear driveline 18 so as to eliminate the use of a mainshaft/rear output in transfer case 16. A bellow-type boot cover 107 is shown between stubshaft segment 100 of first sprocket 74 and end segment 28A of rear output shaft 28. A deflector plate 109 is also mounted to stubshaft segment 100 and is located between rotary seal 108 and boot cover 107.

Figure 4:
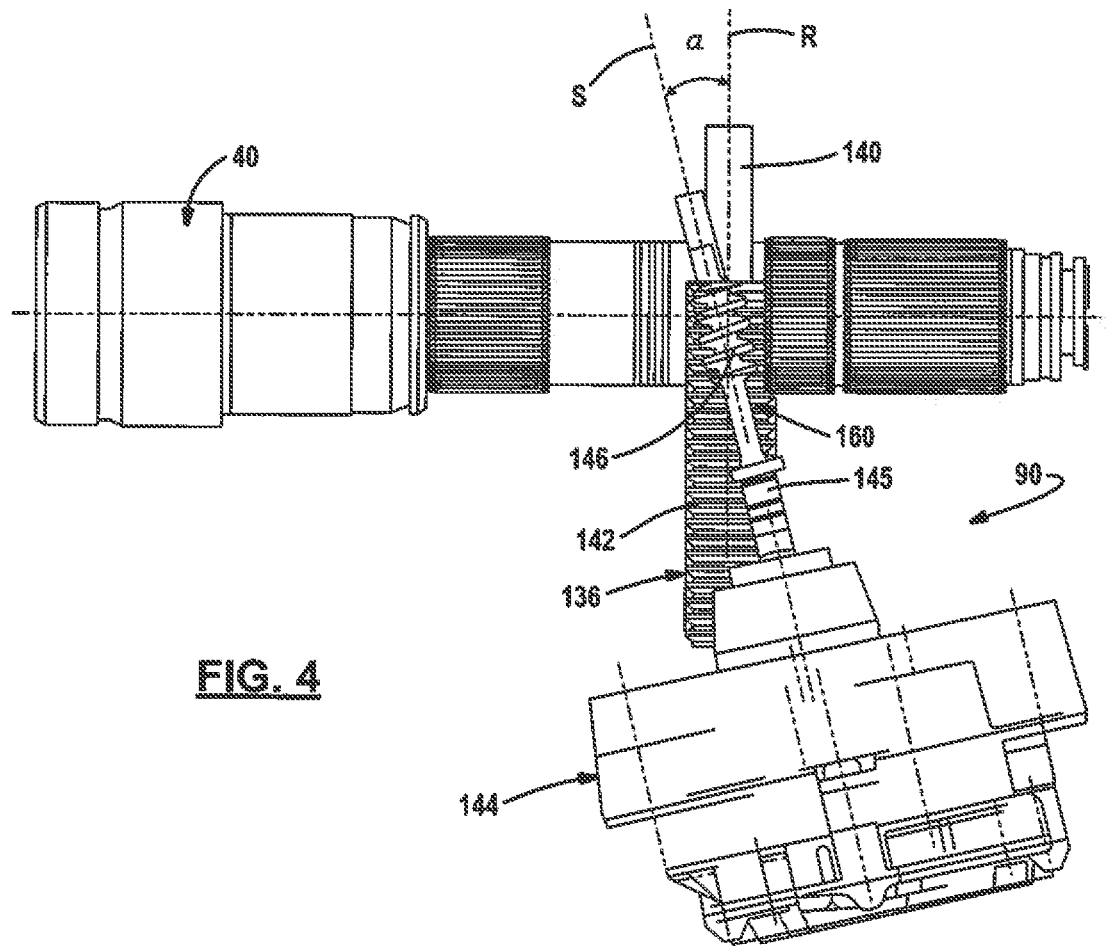
FIG. 4 is a view illustrating components of a power-operated clutch actuator adapted for use with the transfer case of the present disclosure.
Figure 5:
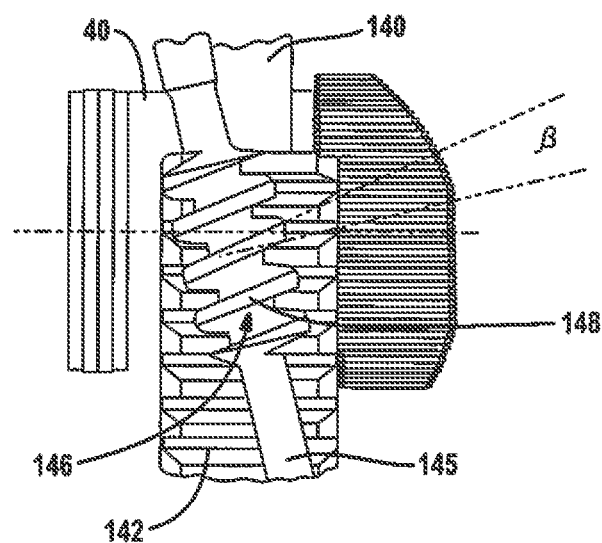
FIG. 5 shows an enlarged partial view of FIG. 4.

Front output shaft 40 is rotatably supported in t-case housing 62 by a pair of laterally-spaced bearing assemblies 110, 112. A rotary seal 114 and a deflector plate 116 are also attached to front output shaft 40. Second sprocket 76 is supported by a suitable bearing assembly 118 for rotation relative to front output shaft 40. A radial thrust bearing 120 and a retainer ring 122 delineate an edge of second sprocket 76. In the non-limiting embodiment shown, first clutch member 80 of clutch assembly 70 is a clutch drum that is fixed for common rotation with second sprocket 76. Likewise, second clutch member 82 of clutch assembly 70 is a clutch hub that is fixed for common rotation with front output shaft 40. Clutch pack 84 includes a set of outer clutch plates splined to clutch drum 80 and a set of inner clutch plates splined to clutch hub 82. The apply device 88 of clutch actuator 72 is shown, in this non-limiting embodiment, to include a ballramp unit 130 and an apply plate 132. Ballramp unit 130 includes a stationary first cam or support ring 134 that is non-moveably fixed to t-case housing 62, a rotatable and axially moveable second cam or adjustment ring 136, and a plurality of circumferentially-spaced balls 138 that are retained in aligned cam grooves formed in each of the first and second cam rings. Adjustment ring 136 includes a radially-extending sector flange 140 having gear teeth 142 formed at its peripheral edge. Powered drive unit 90 is best shown in FIGS. 4 and 5 to include an electric motor 144 having a rotary output 145 with a worm 146 having threads 148 meshingly engaged with gear teeth 142 on sector flange 140 of adjustment ring 136. Rotation of worm 146 in a first direction causes rotation of adjustment ring 136 due to engagement of threads 148 with gear teeth 142 in a first direction which, in turn, causes axial translation of adjustment ring 136 in a first or "clutch engage" direction toward clutch pack 84. Apply plate 132 is axially moveable with adjustment ring 136 in this clutch engage direction to apply the clutch engagement force to clutch pack 84. Obviously, rotation of worm 146 in a second direction causes axial translation of adjustment ring 136 and apply plate 132 an opposite second or "clutch release" direction away from clutch pack 84. A thrust bearing 150 is disposed between apply plate 132 and adjustment ring 136 to facilitate relative rotation therebetween. A return spring (not shown) acts to normally bias apply plate 132 and adjustment ring 136 in the clutch release direction.

To be able to bring about the explained rotary and axial movement of the adjustment ring 136, it is drive-operationally coupled to electric motor 144 via a step-down transmission 160. This is shown in the plan view in accordance with FIG. 4. In accordance with FIG. 4, powered driver unit 90 includes the reduction gear unit 160 formed by the worm gearset having helical threads 148 of worm 146 meshing with spur gear teeth 142 formed on sector flange 140. The worm 146 is rotationally fixedly coupled with output shaft 145 of the electric motor 144. The spur gear flange section 140 can be made in one piece with the adjustment ring 136.

The axis of rotation S of worm 146 is inclined by an oblique position angle α with respect to the rotational plane R of spur gear flange section 140 of adjustment ring 136. This oblique position angle α corresponds to the pitch angle β of threads 148 on worm 146. The pitch angle β of worm 146 is shown in FIG. 5 which shows a detailed view of the engagement region between helical threads 148 of worm 146 and spur gear teeth 142 on flange section 140. The pitch angle β can be recognized here as the angle which the worm thread 148 adopts relative to a normal plane of the worm axis S. As can furthermore be seen in FIG. 4, spur gear section 140 of the adjustment ring 136 has a straight toothed arrangement. Spur gear section 140 is made as a peripheral section of a cylindrical spur gear, that is not, for instance, as an enveloping gear. Worm 146 is made as a cylinder worm, with worm 146 and spur gear section 140 being in engagement in the manner of a bevel gear toothed arrangement. Alternatively, worm 146 can, however, also be made as an enveloping worm to mesh with spur gear section 140 in the manner of a spur gear worm toothed arrangement.

Thread 148 of worm 146 hereby extends in the engagement region between worm 146 and spur gear flange section 140 substantially parallel to the axis of rotation A of adjustment ring 136. Adjustment ring 136 can thus move freely, i.e. without a superimposed rotary movement, in the axial direction and the rotary drive of adjustment ring 136 by means of worm 140 does not result in any additional axial forces and tilting moments, or only in slight additional axial forces and tilting moments, which act on adjustment ring 136. A precise control of power-operated clutch actuator 72 and a precise actuation of multi-plate friction clutch 70 are hereby possible. This applies in particular if the control of the actuator is based on a monitoring of the motor current of electric motor 144.

Those skilled in the art will appreciate that apply device 88 can include any device capable of applying a clutch engagement force and may include, without limitation, linear actuators, leadscrew drives, pivot actuators, EM actuators, hydraulic actuators and the like having movement controlled by a powered driver unit 90 which may include, without limitations, electric motors, hydraulic power packs, EM actuators and the like. Those alternative devices and units are intended to be sufficiently disclosed based on the schematic illustrations thereof provided in FIG. 2 to define alternative embodiments to the devices and unit associated with the power-operated clutch actuator 72 shown in FIGS. 3-5.

Figure 6:
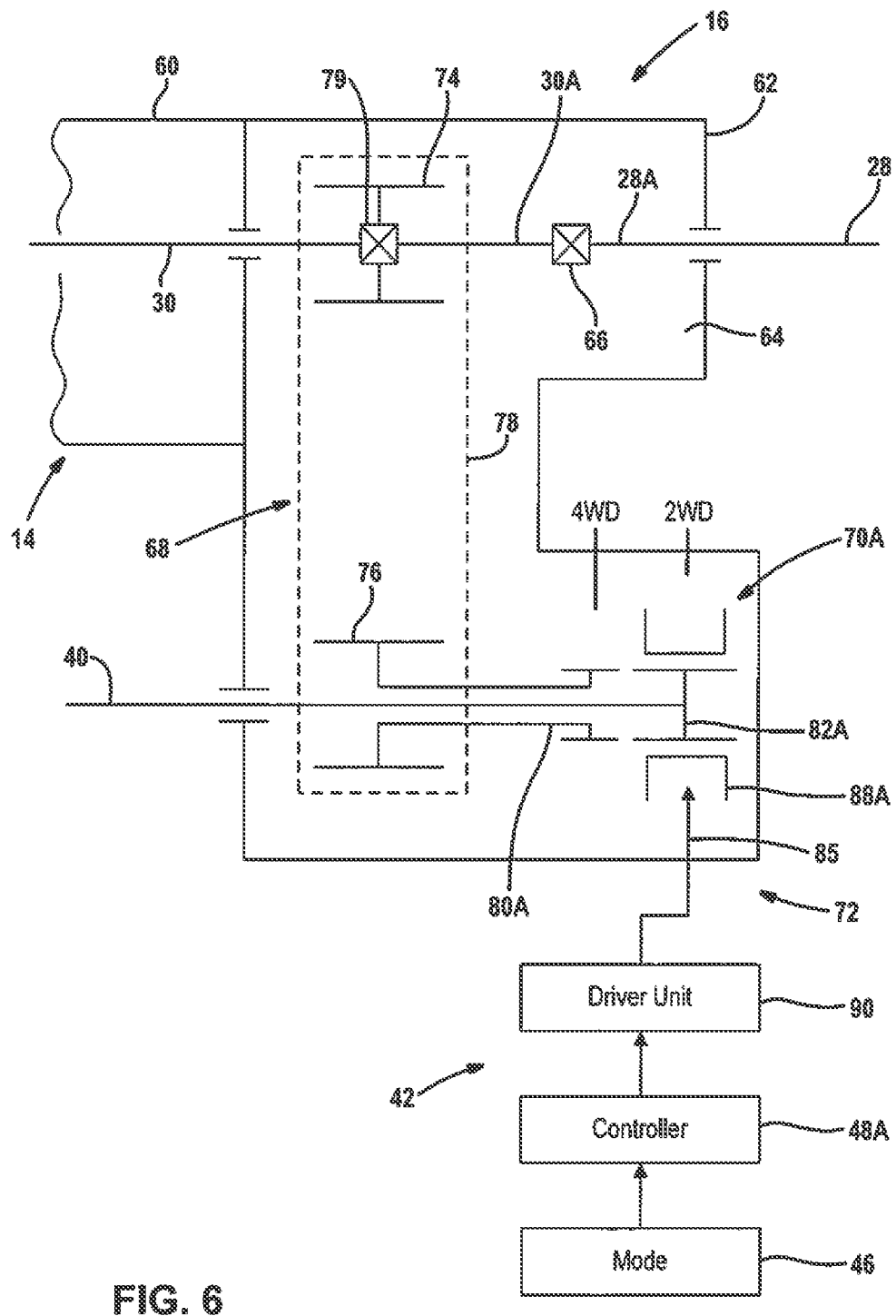
FIG. 6 is another diagrammatical illustration of the transfer case of the present disclosure now equipped with an alternative clutch arrangement.

Referring now to FIG. 6, a one-speed transfer case 16A is shown and which is generally an alternative version of transfer case 16 shown in FIG. 2 having a positive-locking type of mode clutch 70A replacing multi-plate friction clutch 70. As seen, mode clutch 70A includes a first clutch member 80A fixed for common rotation with second sprocket 76 of transfer assembly 68, a second clutch member 82A fixed for common rotation with first output shaft 40, and an apply component 88A operable for coupling second clutch member 82A for common rotation with first clutch member 80A so as to transmit drive torque from transmission shaft 30 to front output shaft 40 through transfer assembly 68. In this non-limiting embodiment, first clutch member 80A is a clutch ring, second clutch member 82A is a clutch hub, and apply member 88A is a sliding mode sleeve. The mode sleeve is splined for common rotation with the clutch hub (and first output shaft 40) and is axially moveable between a first or 2WD mode position (shown) and a second or 4WD mode position. A mode shift mechanism 85 interconnects mode sleeve 88A to powered drive unit 90 which, in turn, control movement of mode sleeve 88A between its first and second mode positions. In the first mode position, first output shaft 40 is uncoupled from driven connection with transmission shaft 30. In contrast, movement of mode sleeve 88A into its second mode position results in establishment of a drive connection between transmission shaft 30 and front output shaft 40 through transfer assembly 68. Thus, transfer case 16A illustrates a pass-through rear drive arrangement in combination with a positive locking type of mode clutch arrangement on the front output shaft.

Figure 7:
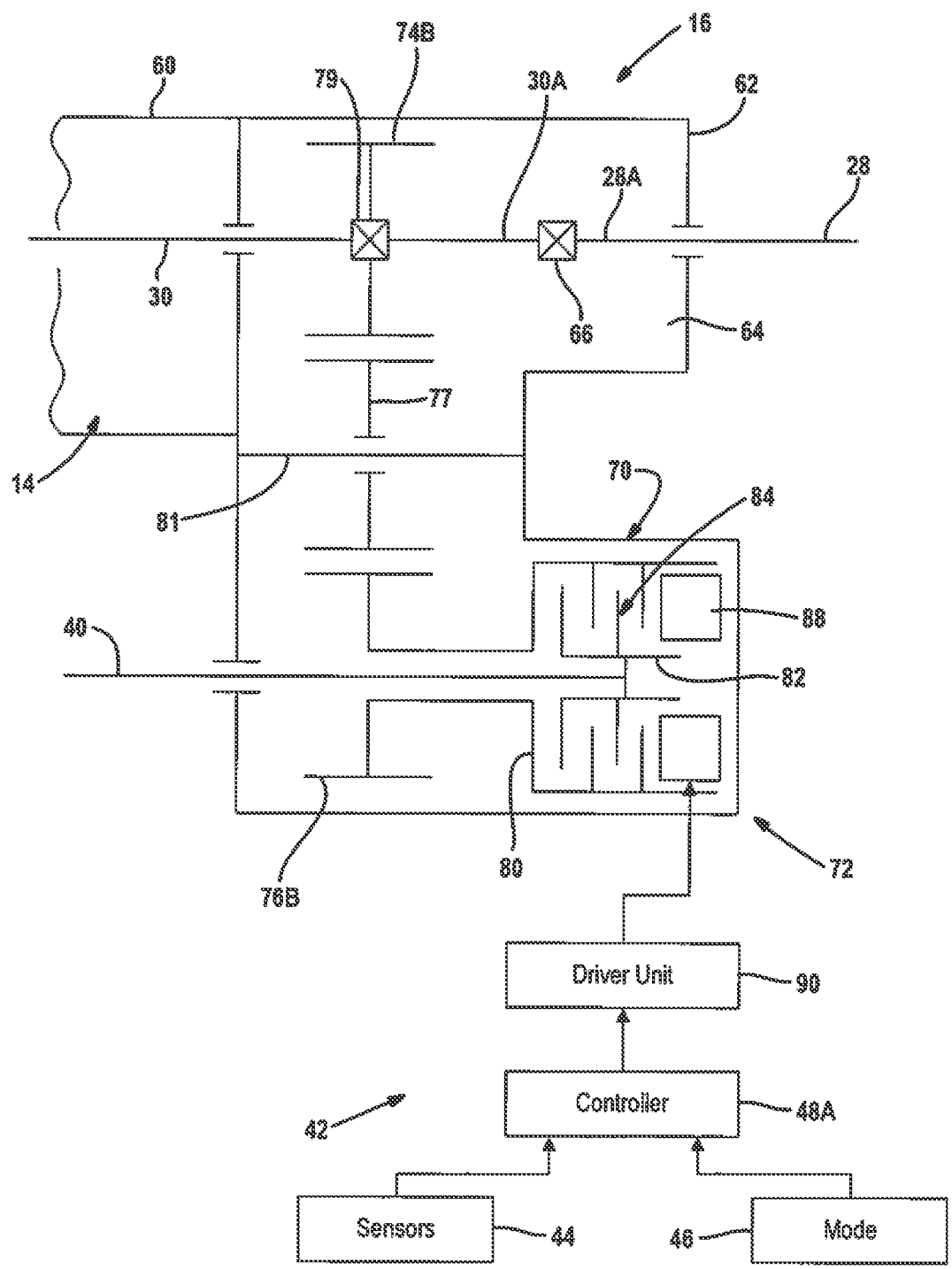
FIG. 7 is yet another diagrammatical illustration of the transfer case of the present disclosure now equipped with an alternative transfer assembly.

Referring now to FIG. 7, one-speed active transfer case 16B is shown which is generally an alternative version of transfer case 16 of FIG. 2 having a geared transfer assembly 68B instead of chain and sprocket transfer assembly 68. As seen, geared transfer assembly 68B includes a first gear 74B fixed via connection interface 79 for common rotation with transmission shaft 30, a second gear 76B rotatably supported on first output shaft 40, and a third gear 77 in constant mesh with first gear 74B and second gear 76B. Third gear 77 is shown to be rotatably supported on an idler shaft 81 mounted in t-case housing 62 and functions to maintain the desired rotational direction relationship between transmission shaft 30 and front output shaft 40. The operation and function of multi-plate friction clutch 70 and power-operated clutch actuator 72 being the same as previously disclosed in relationship to transfer case 16.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A transfer case for use in a four-wheel drive motor vehicle having a powertrain and front and rear drivelines, the transfer case comprising:
   a t-case housing adapted to be secured to a transmission housing of a transmission associated with the powertrain and having a transmission output shaft extending from the transmission housing into the t-case housing;
   an end segment of a rear propshaft associated with the rear driveline extending into the t-case housing and being directly coupled for common rotation with the transmission output shaft;
   a front output shaft rotatably supported in the t-case housing and adapted to be coupled to an end segment of a front propshaft associated with the front driveline;
   a transfer assembly disposed within the t-case housing and having a first transfer member fixedly coupled for rotation with the transmission output shaft, a second transfer member surrounding the front output shaft, and a third transfer member drivingly interconnecting the first and second transfer members; and
   a clutch assembly operable for selectively coupling and uncoupling the second transfer member with the front output shaft,
   wherein the transmission output shaft is a tubular member having an outer surface and an inner surface, wherein the end segment of the rear propshaft is disposed within the tubular member and has external splines meshed with internal splines formed on the inner surface of the tubular member, and wherein the first transfer member surrounds the outer surface of the tubular member and is fixedly secured thereto via a splined connection.

2. The transfer case of claim 1 further comprising a power-operated clutch actuator for controlling actuation of the clutch assembly.

3. The transfer case of claim 1 wherein the transfer assembly is a sprocket and chain assembly with the first transfer member being a first sprocket, the second transfer member being a second sprocket, and the third transfer member being a chain encircling and meshing with the first and second sprockets.

4. The transfer case of claim 1 wherein the transfer assembly is a gear assembly with a first gear as the first transfer member, a second gear as the second transfer member, and a third gear as the third transfer member and which is meshed with the first and second gears.

5. The transfer case of claim 1 wherein an end segment of the transmission output shaft extends through the t-case housing to define a pass-through configuration.

6. The transfer case of claim 1 wherein the clutch assembly is a multi-plate friction clutch operably disposed between the second transfer member and the front output shaft, and further comprising a power-operated actuator for selectively actuating the friction clutch to couple the second transfer member to the front output shaft.

7. The transfer case of claim 1 wherein the end segment of the rear propshaft which extend into the t-case housing is a shaft segment of a joint unit.

8. The transfer case of claim 7 wherein the shaft segment of the joint unit has external splines meshed with internal splines formed in a tubular end segment of the transmission output shaft.

9. The transfer case of claim 1 wherein the first transfer member has a tubular shaft segment which is rotatably supported by a pair of laterally-spaced bearings with the t-case housing, wherein an end segment of the transmission output shaft extends through the tubular shaft segment of the first transfer member, and wherein the end segment of the transmission output shaft is directly coupled to the end segment of the rear propshaft.

10. The transfer case of claim 9 wherein the end segment of the rear propshaft is a shaft segment of a joint unit, and wherein the shaft segment of the joint unit extends into a tubular portion of the end segment of the transmission output shaft and is spline coupled thereto.

11. The transfer case of claim 9 wherein the end segment of the transmission output shaft defines an internally-splined portion that is meshed with an externally-splined portion on the end segment of the rear propshaft.

12. The transfer case of claim 1 wherein the powertrain generates drive torque that is directly transmitted by the transmission output shaft to the rear driveline, and wherein the transfer assembly is driven by the transmission output shaft such that actuation of the clutch assembly results in the transfer of drive torque from the transmission output shaft to the front output shaft through the transfer assembly.

13. The transfer case of claim 12 wherein actuation of the clutch assembly establishes a four-wheel drive mode and release of the clutch assembly establishes a two-wheel drive mode.

14. The transfer case of claim 1 wherein the first transfer member surrounds the transmission output shaft and has an end segment extending out of the t-case housing, wherein the first transfer member is splined coupled for common rotation with the transmission output shaft, wherein the transmission output shaft surrounds the end segment of the rear propshaft and has an end segment extending out of the t-case housing and wherein the end segment of the rear output shaft is spline coupled for common rotation with the end segment of the transmission output shaft.

15. A transfer case for use in a four-wheel drive motor vehicle having a powertrain and front and rear drivelines, the transfer case comprising:
a t-case housing adapted to be secured to a transmission housing of a transmission associated with the powertrain and having a transmission output shaft extending from the transmission housing into the t-case housing;
an end segment of a rear propshaft associated with the rear driveline extending into the t-case housing and being directly coupled for common rotation with the transmission output shaft;
a front output shaft rotatably supported in the t-case housing and adapted to be coupled to an end segment of a front propshaft associated with the front driveline;
a transfer assembly disposed within the t-case housing and having a first transfer member fixedly coupled for rotation with the transmission output shaft, a second transfer member surrounding the front output shaft, and a third transfer member drivingly interconnecting the first and second transfer members; and
a clutch assembly operable for selectively coupling and uncoupling the second transfer member with the front output shaft,
wherein the first transfer member has a tubular shaft segment which is rotatably supported by a pair of laterally-spaced bearings with the t-case housing, wherein an end segment of the transmission output shaft extends through the tubular shaft segment of the first transfer member, and wherein the end segment of the transmission output shaft is directly coupled to the end segment of the rear propshaft.

16. The transfer case of claim 15 wherein the end segment of the rear propshaft is a shaft segment of a joint unit, and wherein the shaft segment of the joint unit extends into a tubular portion of the end segment of the transmission output shaft and is spline coupled thereto.

17. The transfer case of claim 15 wherein the end segment of the transmission output shaft defines an internally-splined portion that is meshed with an externally-splined portion on the end segment of the rear propshaft.

18. A transfer case for use in a four-wheel drive motor vehicle having a powertrain and front and rear drivelines, the transfer case comprising:
a t-case housing adapted to be secured to a transmission housing of a transmission associated with the powertrain and having a transmission output shaft extending from the transmission housing into the t-case housing;
an end segment of a rear propshaft associated with the rear driveline extending into the t-case housing and being directly coupled for common rotation with the transmission output shaft;
a front output shaft rotatably supported in the t-case housing and adapted to be coupled to an end segment of a front propshaft associated with the front driveline;
a transfer assembly disposed within the t-case housing and having a first transfer member fixedly coupled for rotation with the transmission output shaft, a second transfer member surrounding the front output shaft, and a third transfer member drivingly interconnecting the first and second transfer members; and
a clutch assembly operable for selectively coupling and uncoupling the second transfer member with the front output shaft,
wherein the first transfer member surrounds the transmission output shaft and has an end segment extending out of the t-case housing, wherein the first transfer member is splined coupled for common rotation with the transmission output shaft, wherein the transmission output shaft surrounds the end segment of the rear propshaft and has an end segment extending out of the t-case housing and wherein the end segment of the rear output shaft is spline coupled for common rotation with the end segment of the transmission output shaft.

* * * * *